United States Patent
Lüke

(10) Patent No.: US 7,800,516 B2
(45) Date of Patent: Sep. 21, 2010

(54) METHOD FOR DETERMINING THE ABILITY TO ENTER A PARKING SPACE AND A PARKING ASSIST DEVICE

(75) Inventor: Stefan Lüke, Olpe (DE)

(73) Assignee: Continental Teves, Inc., Auburn Hills, MI (US)

( * ) Notice: Subject to any disclaimer, the term of this patent is extended or adjusted under 35 U.S.C. 154(b) by 585 days.

(21) Appl. No.: 11/793,960

(22) PCT Filed: Dec. 22, 2005

(86) PCT No.: PCT/EP2005/057120
§ 371 (c)(1), (2), (4) Date: Nov. 28, 2007

(87) PCT Pub. No.: WO2006/069973
PCT Pub. Date: Jul. 6, 2006

(65) Prior Publication Data
US 2008/0252486 A1  Oct. 16, 2008

(30) Foreign Application Priority Data

Dec. 24, 2004 (DE) .................. 10 2004 062 549
Dec. 22, 2005 (DE) .................. 10 2005 062 086

(51) Int. Cl.
*B60Q 1/48* (2006.01)
(52) U.S. Cl. .................. 340/932.2; 340/436; 701/41
(58) Field of Classification Search ............ 340/932.2, 340/436; 180/204; 701/41–44
See application file for complete search history.

(56) References Cited

U.S. PATENT DOCUMENTS

| 6,587,760 | B2* | 7/2003 | Okamoto .................. 701/1 |
| 6,711,473 | B2* | 3/2004 | Shimazaki et al. .......... 701/1 |
| 7,053,795 | B2* | 5/2006 | Maemura et al. ........ 340/932.2 |
| 7,263,420 | B2* | 8/2007 | Tanaka et al. ............ 701/36 |
| 7,375,651 | B2* | 5/2008 | Shimazaki et al. ...... 340/932.2 |
| 2002/0026269 | A1* | 2/2002 | Tanaka et al. ........... 701/41 |
| 2002/0104700 | A1* | 8/2002 | Shimazaki et al. ........ 180/204 |
| 2006/0190147 | A1* | 8/2006 | Lee et al. .............. 701/26 |

FOREIGN PATENT DOCUMENTS

| DE | 19922173 | 11/1999 |
| DE | 102005006966 | 9/2005 |
| FR | 2728859 | 7/1996 |
| WO | 2005085043 | 9/2005 |

* cited by examiner

*Primary Examiner*—Eric M Blount

(57) ABSTRACT

Disclosed is a method of determining the ability to enter a parking gap starting from an initial position of a vehicle. The negotiability is determined by way of two characteristic diagrams ($y_{min}(\delta,\theta,x)$; $y_{max}(\delta,\theta,x)$), with the two characteristic diagrams ($y_{min}(\delta,\theta,x)$; $y_{max}(\delta,\theta,x)$) indicating for several predetermined sets of values of first vehicle quantities ($\delta$; $\theta$; x) a minimum value ($y_{min}(\delta,\theta,x)$) and a maximum value ($y_{max}(\delta,\theta,x)$) for a second vehicle quantity (y), and with the first vehicle quantities ($\delta$; $\theta$; x) and the second vehicle quantity (y) being selected from the group comprising a longitudinal (x) and a lateral (y) distance of the vehicle (1) from the parking gap (9), a yaw angle ($\theta$) of the vehicle (1) and a steering angle ($\delta$) at steerable wheels (2a, 2b) of the vehicle (1). A parking assist device is suitable to implement the method.

18 Claims, 2 Drawing Sheets

METHOD FOR DETERMINING THE ABILITY TO ENTER A PARKING SPACE AND A PARKING ASSIST DEVICE

BACKGROUND OF THE INVENTION

The present invention relates to a method of determining the ability to enter a parking gap starting from an initial position of a vehicle.

The invention further relates to a parking assist device that is suitable to implement the method.

In German published patent application DE 10 2005 006 966 A1, a method of pulling a vehicle into a parking gap is described, wherein a pull-up path of the vehicle comprises an invariable section in the area of the parking gap and a start-up path with a start point at the invariable section. The start-up path, which is covered starting from an initial position until the start point, is calculated in the way of a polynomial. It must be ensured then that the vehicle can be steered, starting from the initial position, at a predetermined yaw angle to the invariable section of the pull-up path and into the parking gap, respectively.

To this end, it is especially provided in the prior art method that a characteristic diagram is used to detect on the basis of the vehicle position, the vehicle yaw angle, and the vehicle steering angle, whether it is possible to enter the parking gap from a given initial position. The characteristic diagram is calculated (offline) beforehand and saved in a control device in the vehicle.

As this occurs, the yaw angle and the steering angle must be saved in the control device for a multitude of possible initial positions for a parking maneuver, what necessitates a relatively large memory capacity for the characteristic diagram.

In view of the above, it is an object of the invention to enable determining the ability to enter a parking gap by using a characteristic diagram, and to reduce the required memory capacity for saving the characteristic diagram.

SUMMARY OF THE INVENTION

According to the invention, this object is achieved by a method of the type mentioned hereinabove which is carried out in such a fashion that the negotiability is determined by way of two characteristic diagrams, with the two characteristic diagrams indicating for several predefined sets of values of first vehicle quantities a minimum value and a maximum value for a second vehicle quantity, and with the first vehicle quantities and the second vehicle quantity being selected from a group comprising a longitudinal and a lateral distance of the vehicle from the parking gap, a yaw angle of the vehicle, and a steering angle at steerable wheels of the vehicle.

The parking assist device of the invention for determining the ability to enter a parking gap starting from an initial position of a vehicle is characterized in that it comprises a memory, in which two characteristic diagrams are saved, with the two characteristic diagrams indicating for several predefined sets of values of first vehicle quantities a minimum value and a maximum value for a second vehicle quantity, and with the first vehicle quantities and the second vehicle quantity being selected from a group comprising a longitudinal and a lateral distance of the vehicle from the parking gap, a yaw angle of the vehicle, and a steering angle at steerable wheels of the vehicle.

Thus, the invention includes the idea of detecting the ability to enter the parking gap by way of two characteristic diagrams. The characteristic diagrams indicate for predetermined sets of values of first vehicle quantities a minimum value and a maximum value for a second vehicle quantity. The invention makes use of the knowledge that the ability to enter the parking gap in the presence of defined values of the first vehicle quantities is given for all values of the second vehicle quantity ranging between the minimum value and the maximum value.

It was found out in addition that the two characteristic diagrams, which indicate the minimum values and maximum values for the second vehicle quantity, have a lower memory capacity requirement than one single characteristic diagram, which indicates the negotiability of the parking gap for the same predetermined sets of first vehicle quantities and predetermined values of the second vehicle quantity.

Further, the lateral and the longitudinal distance of the vehicle from the parking gap, the yaw angle of the vehicle, and the steering angle of the vehicle can favorably be used to determine the negotiability of the parking gap. The lateral distance of the vehicle from the parking gap refers in this respect to the distance between the parking gap and the vehicle that is measured in a transverse direction relative to the parking gap. Accordingly, the longitudinal distance of the vehicle from the parking gap refers to the distance between the vehicle and the parking gap that is measured in a longitudinal direction relative to the parking gap. The distance of the vehicle from the parking gap in this respect refers in particular to the distance between a reference point of the vehicle and a point of the parking gap.

In a preferred embodiment of the method of the invention and the parking assist device of the invention, it is arranged that the ability to enter the parking gap is established when the present value of the second vehicle quantity lies between the minimum value and the maximum value indicated by the characteristic diagrams for the present values of the first vehicle quantities.

A particularly favorable embodiment of the method of the invention and the parking assist device of the invention provides that the second vehicle quantity is the lateral distance of the vehicle from the parking gap.

In addition, a favorable embodiment of the method of the invention and the parking assist device of the invention is characterized in that the first vehicle quantities relate to the longitudinal distance of the vehicle from the parking gap and the yaw angle of the vehicle.

A likewise preferred embodiment of the method of the invention and the parking assist device of the invention is characterized in that the first vehicle quantities relate to the longitudinal distance of the vehicle from the parking gap, the yaw angle of the vehicle, and the steering angle at the steerable wheels of the vehicle.

In a preferred improvement of the method of the invention and the parking assist device of the invention, it is provided that the minimum values and maximum values, as indicated by the characteristic diagrams, for the second vehicle quantity relate to the maneuver of pulling up into a parking gap with the smallest possible longitudinal extension for negotiability.

This allows further reducing the memory capacity requirement, as it is unnecessary to provide characteristic diagrams for any longitudinal extensions of a parking gap whatsoever.

Expediently, an embodiment of the method of the invention and the parking assist device of the invention arranges for an adaptation of the characteristic diagrams to the longitudinal extension of the prevailing parking gap.

In a particularly favorable embodiment of the method of the invention and the parking assist device of the invention, it is arranged that the adaptation is carried out by scaling the longitudinal distance of the vehicle from the parking gap with a scaling factor.

In addition, it is arranged in an especially advantageous embodiment of the method of the invention and the parking assist device of the invention that the yaw angle of the vehicle is defined as an angle between the vehicle longitudinal direction and an x axis of a system of coordinates, which is directed in a longitudinal direction of the parking gap, and that the adaptation is performed by transforming the yaw angle into a system of coordinates whose x axis is scaled with a scaling factor.

An expedient embodiment of the method of the invention and the parking assist device of the invention is characterized in that the scaling factor is determined from a ratio of the longitudinal extension of the present parking gap to the longitudinal extension of the parking gap with the smallest possible longitudinal extension for negotiability.

In another expedient embodiment of the method of the invention and the parking assist device of the invention, the scaling factor is predetermined as a function of the longitudinal extension of the present parking gap.

In general, a set of present values of the first vehicle quantities of the first vehicle quantities does not correspond to one of the sets of values of the first vehicle quantity as predetermined by way of the characteristic diagrams. In order to find out about the negotiability of the parking gap in a reliable and safe manner, it is provided within the limits of the invention that, for the set of actual values, the 'most unfavorable' predetermined set of values of the first vehicle quantities is determined and made the basis of the determination of the negotiability of the parking gap.

A preferred improvement of the method of the invention and the parking assist device of the invention is therefore characterized in that for a set of present values of the first vehicle quantities, several predetermined sets with neighboring values for the first vehicle quantities are determined, and that it is found out that it is impossible to enter the parking gap when the minimum value of the second vehicle quantity indicated for one of the established predefined sets exceeds the present value of the second vehicle quantity.

Furthermore, it is provided in a preferred improvement of the method of the invention and the parking assist device of the invention that for a set of present values of the first vehicle quantities, several predetermined sets with neighboring values for the first vehicle quantities are determined, and that it is found out that it is impossible to enter the parking gap when the maximum value of the second vehicle quantity indicated for one of the established predefined sets is lower than the present value of the second vehicle quantity.

For example, when pulling into a parking gap at inside curves or when undercutting the parking gap, it is possible to enter the parking gap even if the second vehicle quantity is outside the range limited by the minimum values and maximum values.

It is arranged for in a preferred embodiment of the method of the invention and the parking assist device of the invention that after having passed by the parking gap, it is checked in each case for successive points of a path of the vehicle, whether it is possible to enter the parking gap from the said points, given the present yaw angle and the present steering angle.

Therefore, a favorable improvement of the method of the invention and the parking assist device of the invention provides that during travel of the vehicle in a first driving direction, the steering angle values of the steering angle adjusted by the driver at the steerable wheels and the values of the lateral and longitudinal distance of the vehicle from the parking gap which pertain to the steering angle values are saved after it has been established that the second vehicle quantity has fallen below the minimum value indicated by a first characteristic diagram or has exceeded the maximum value indicated by a second characteristic diagram.

This way, the travel which has been covered for a parking maneuver after having left the valid range of the possible initial positions indicated by the characteristic diagrams can be traced in a simple way, and the vehicle can be returned into the valid range. This corresponds to an extension of the valid range.

Therefore, it is arranged for in a favorable embodiment of the method of the invention and the parking assist device of the invention that during travel of the vehicle in a second driving direction, the saved steering angle value for the steering angle of the steerable wheels of the vehicle is adjusted by means of a steering angle adjusting device when the lateral and the longitudinal distance of the vehicle from the parking gap adopt the values saved with respect to the steering angle value.

Preferably, this action is taken after the driver has stopped the vehicle and has started an automatic parking maneuver.

An appropriate improvement of the method of the invention and the parking assist device of the invention is therefore characterized in that the saved steering angle values for the steering angle are adjusted by means of the steering angle adjusting device after the driver has stopped the vehicle.

Further advantages, special features and suitable improvements of the invention can be taken from the sub claims and the following description of preferred embodiments by way of the Figures.

DETAILED DESCRIPTION OF THE DRAWINGS

Figure 1:
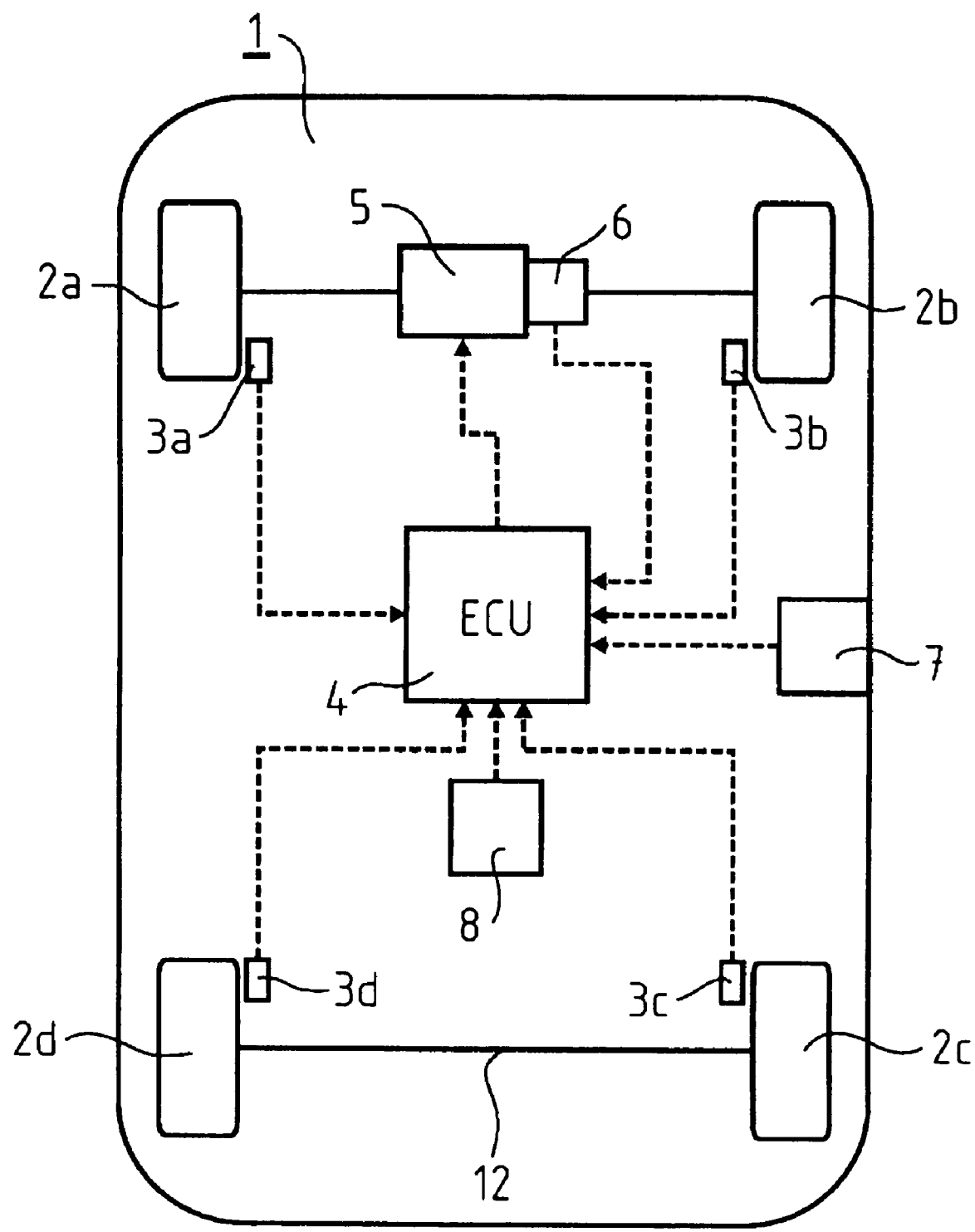
FIG. 1 is a schematic view of a motor vehicle that is appropriate for implementing the invention.

The motor vehicle shown schematically in FIG. 1, referred to as a whole with reference numeral 1, is provided with four wheels $2a, \ldots, 2d$, to each of which one wheel speed sensor $3a, \ldots, 3d$ is assigned, the signals of this sensor being connected to a control unit (ECU) 4. The vehicle 1 features at least two steerable wheels that are the front wheels $2a, 2b$ in the embodiment of the invention shown. The front wheels $2a, 2b$ are connected through a steering line to a steering actuator element that is not shown in FIG. 1 and allows the driver of the vehicle 1 to set a steering angle at the front wheels $2a, 2b$. Moreover, the steering line preferably contains an electromechanical adjusting device 5 that also allows a steering angle or a steering torque that can be felt by the driver to be set independently of the driver's preset. The control commands for setting the steering angle or the steering torque are sent by the control unit 4 to the adjusting device 5. Hereinafter, it is assumed, by way of example, that the adjusting device 5 is a steering angle adjusting device that receives and converts control commands for setting a nominal steering angle from the control unit 4.

The steering line comprises a steering angle sensor 6 whose signals are connected to the control unit 4 for measurement of the steering angle δ at the front wheels 2a, 2b.

On the basis of the signals of the wheel speed sensors 3a, ..., 3b, the control unit 4 is able to determine, in particular, the distance that the vehicle 1 has traveled, starting from a specific point. The direction of vehicle movement can be determined on the basis of the signal of the steering angle sensor 6. Consequently, each current position of the vehicle 1 relative to a reference point, such as the corner point of a parking gap, can be determined.

Figure 2:
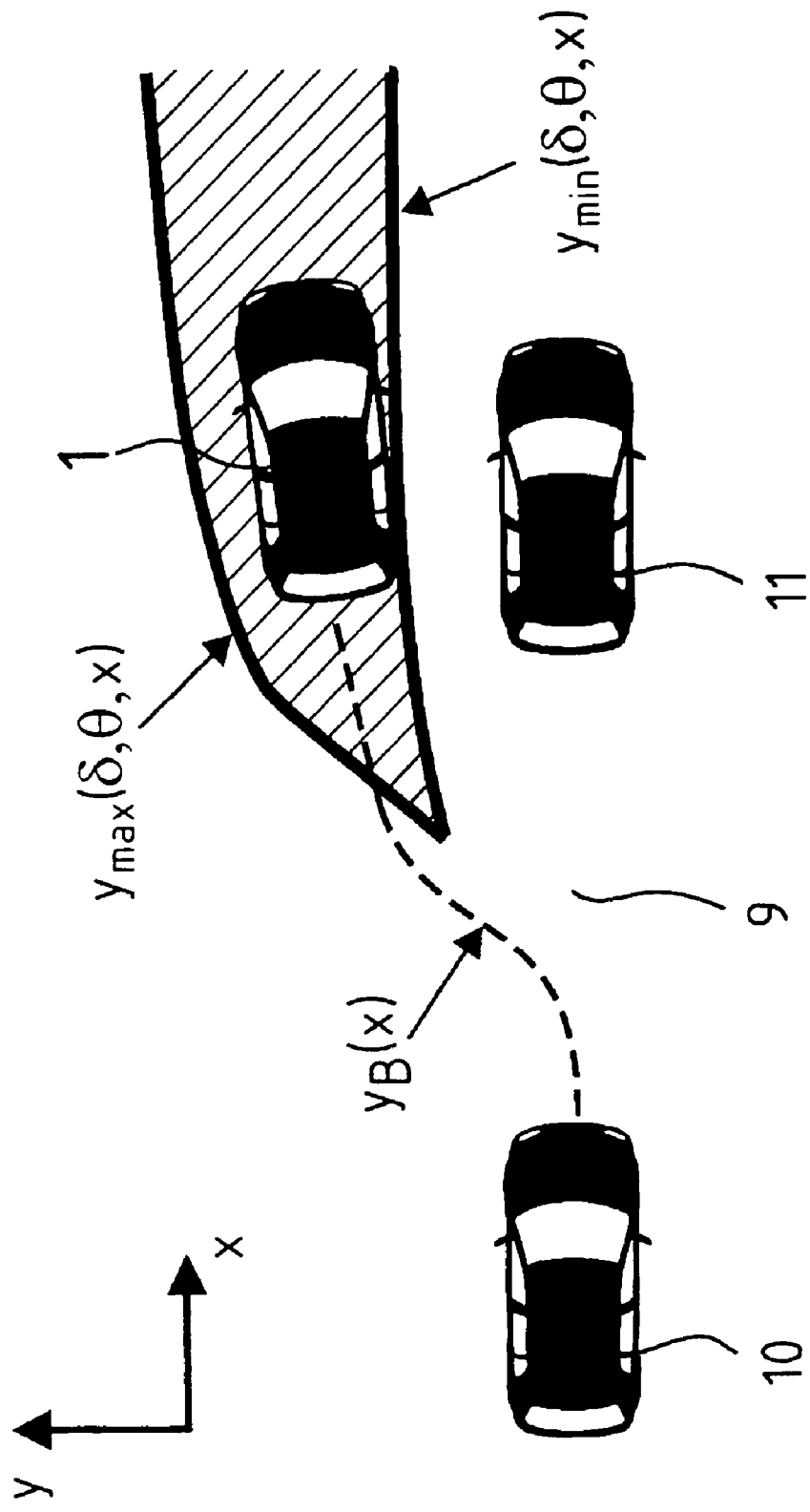
FIG. 2 is a schematic view of a nominal pull-up path for a parking maneuver as well as two characteristic diagrams, which delimit a valid range of possible start points for the parking maneuver.

Moreover, the yaw angle θ of the vehicle can be determined from the wheel speed signal and the steering angle signal, and the term "yaw angle θ" in this case means the angle between the vehicle longitudinal axis and the longitudinal axis of the parking gap to be entered, i.e. the x axis of the system of coordinates shown in FIG. 2.

Optionally, the vehicle 1, in one embodiment of the invention, may also feature a yaw rate sensor 8 or a yaw angle sensor whose signals are connected to the control unit 4. These sensors can be used in this case for checking the yaw angle θ of the vehicle 1 or for checking the plausibility of the yaw angle θ of the vehicle 1, computed from the wheel speed and steering angle signals.

Moreover, the vehicle 1 features at least one environment sensor 7 whose signals are connected to the control unit 4, and which is used to allow at least distances between the vehicle 1 and objects at the side of the vehicle 1 to be determined. The environment sensor 7 can, in this case, be designed as a radar sensor, a lidar sensor, an ultrasound sensor or an infrared sensor. Moreover, the environment sensor 7 may also represent a camera that supplies images of the vehicle's environment from which it is possible to determine the distance between the vehicle and objects at the side of the vehicle, in particular.

The control unit 4 is used to perform a parking function, which implies that a parking gap is measured automatically and the vehicle 1 is parked automatically in a parking gap. Preferably, it is provided that the vehicle 1 is steered during the parking maneuver on the basis of control commands of the control unit 4 by means of the adjusting device 5, and that the longitudinal guidance of the vehicle, i.e. acceleration and deceleration, is performed independently by the driver of the vehicle 1, however. A nominal pull-up path $y_B(x)$ is determined in the control unit 4 for the parking maneuver. On this nominal pull-up path, the vehicle 1 is then steered by means of a steering angle control unit comprised in the control unit 4, with the control unit submitting correcting commands to the adjusting device 5.

Prior to commencement of the actual parking maneuver, the size of the parking gap and its position relative to the vehicle 1 are initially determined with the environment sensor 7. For this purpose, for example, the distance between the vehicle 1 and objects to the side of the vehicle 1 is determined e.g. while driving past the parking gap. The partial section over which this distance is greater than on the other partial sections corresponds, in this case, to the lateral demarcation of the parking gap.

Starting from a point in front of the parking gap, the position of the vehicle 1 is determined continuously in a reference system permanently linked to the start point on the basis of the signals of the wheel speed sensors 3a, ..., 3d and the signals of the steering angle sensor 6. Knowing the position of the vehicle and based on the distance signals of the environment sensor, it is possible, in this case, to determine the position of the parking gap in the system of coordinates. Consequently, the position of the vehicle 1 relative to the parking gap can be determined after having passed by the parking gap. Preferably, it is arranged that the position of a reference point A of the vehicle 1, e.g. the central point of the rear axle 12 of the vehicle 1, is defined in a system of coordinates, whose origin is in a predefined point of the parking gap, such as a predefined corner of the parking gap.

The parking maneuver controlled by the control unit 4 is performed starting from on an initial position of the vehicle, which the vehicle 1 adopts after having moved past the parking gap. It may e.g. be provided in this case that the driver of the vehicle 1 is informed by means of a signal that a parking gap of adequate size has been determined, the driver then stopping the vehicle 1 in a start position and starting the vehicle. It is provided within the limits of the invention that it is initially checked at the commencement of the parking maneuver, whether it is possible to enter the parking gap without collision from the start position.

It can be provided in another embodiment of the invention that the driver is continuously informed after having passed by the parking gap, whether the vehicle 1 adopts a position from which the parking gap is negotiable. When the driver detects that the vehicle 1 adopts such a position based on the information, he or she can stop the vehicle 1 and start the parking maneuver.

FIG. 2 shows a parking gap 9 whose longitudinal extension is delimited by two vehicles 10 and 11. In this case, for example, these may be two vehicles 10, 11 parked at the kerb. Further, a nominal pull-up path $y_B(X)$ is illustrated as an example.

The negotiability of the parking gap 9 starting from a predetermined position of the vehicle 1 is found out within the limits of the invention using two characteristic diagrams. For predetermined sets of first vehicle quantities, a first characteristic diagram indicates in each case a minimum value and a second characteristic diagram indicates in each case a maximum value for a value of a second vehicle quantity. The first vehicle quantities and the second vehicle quantities correspond to the vehicle quantities that are significant for determining the negotiability, which quantities refer to the lateral distance (distance in y direction) and the longitudinal distance (distance in x direction) of the vehicle 1 from the parking gap 9, the yaw angle of the vehicle 1, and the steering angle at the steerable wheels 2a, 2b of the vehicle.

Thus, the characteristic diagrams indicate a valid area allowing the vehicle 1 to pull up into the parking gap 9.

In one preferred embodiment of the invention, the negotiability of the parking gap 9 is determined on the basis of two characteristic diagrams $y_{min}(\delta,\theta,x)$ and $y_{max}(\delta,\theta,x)$. The characteristic diagram $y_{min}(\delta,\theta,x)$ in this case indicates the lower limit and the characteristic diagram $y_{max}(\delta,\theta,x)$ indicates the upper limit for the y coordinate of the reference point A of the vehicle 1, for which parking at a given steering angle δ and at a given yaw angle θ of the vehicle 1 and a given x coordinate of the reference point A of the vehicle 1 is possible.

For a given yaw angle and given steering angle, the characteristic diagrams $y_{min}(\delta,\theta,x)$ and $y_{max}(\delta,\theta,x)$ consequently delimit a valid range that is shown by way of a hatched area in FIG. 2.

The characteristic diagrams $y_{min}(\delta,\theta,x)$ and $y_{max}(\delta,\theta,x)$ are saved in the control unit 4, wherein one value $y_{min}$ and $y_{max}$ is saved for various combinations of discrete values for the steering angle δ, the yaw angle θ, and the x coordinate of the reference point A of the vehicle 1 in each case. Consequently, this produces a grid of characteristic diagram points in a (δ,θ,x) space in which there is one value saved for $y_{min}$ and one value saved for $y_{max}$ in the control unit 4 for each characteristic diagram point.

It can be demonstrated that the parking gap 9 is negotiable if there is a value triple $(\delta,\theta,x)$ of the values for the yaw angle, the steering angle and the x coordinate of the reference point A of the vehicle 1 for all lateral distances y of the reference point A of the vehicle 1 from the parking gap 9 lying between $y_{min}$ and $y_{max}$.

The characteristic diagrams saved in the control unit 4 relate to the smallest possible parking gap, i.e. the parking gap with the smallest longitudinal extension (extension in x direction), where a parking maneuver is still possible. If the parking gap has a larger longitudinal extension, the determined position of the vehicle 1 or the reference point A is transformed into the system of coordinates, in which the characteristic diagrams are defined, by scaling the x coordinate of the reference point A. Further, the determined yaw angle of the vehicle 1 is also transformed into this system of coordinates. The yaw angle of the vehicle 1 is the angle between the vehicle longitudinal direction and the x axis of the system of coordinates pointing in the longitudinal direction of the parking gap 9 so that the adaptation is performed by transforming the yaw angle into a system of coordinates, whose x axis is scaled with the scaling factor.

The scaling factor for scaling the x coordinates is determined from the ratio between the longitudinal extension of the smallest possible parking gap and the longitudinal extension of the current parking gap 9. It is furthermore checked, whether the minimum distance between the front, right-hand corner of the vehicle 1 to be parked and the rear left-hand corner of the front parking gap boundary (i.e. the vehicle 11) changes when parking to the right or the minimum distance between the front left-hand corner of the vehicle 1 to be parked and the rear, right-hand corner of the front parking gap boundary changes when parking to the left due to scaling by comparison with parking in the smallest possible parking gap on the basis of the corresponding nominal pull-in path. If this check establishes that the indicated minimum distance $y_{min}(\delta,\theta,x)$ is reduced, a greater scaling factor is used.

The scaling factor can be calculated offline for different parking gap lengths and saved in the control unit 4 as a function of the length of the available parking gap 9. Based on this function, it is then possible to determine the scaling factor from the length of the existing parking gap 9 at the commencement of the parking maneuver.

In an embodiment of the invention, it can also be provided that, instead of the vehicle position and the yaw angle, the characteristic diagrams themselves can be scaled by way of a scaling factor in the x coordinate. A function indicating this scaling function is calculated preferably offline for various lengths of parking gaps and saved inside the control unit 4 as a function of the longitudinal extension of the prevailing parking gap. It can be provided in particular, that the scaling operation is performed in different ranges of the x coordinates of the characteristic diagrams using this function in different manner.

Below, it is assumed that such scaling of the x coordinate of the reference point A of the vehicle 1 and of the yaw angle has been performed or that the characteristic diagrams have been scaled.

It is also possible within the limits of the invention to use other characteristic diagrams in lieu of the characteristic diagrams $y_{min}(\delta,\theta,x)$ and $y_{max}(\delta,\theta,x)$, as will be described in more detail hereinbelow. In the following, however, the invention will first be described in more detail by way of the example of the characteristic diagrams $y_{min}(\delta,\theta,x)$ and $y_{max}(\delta,\theta,x)$.

In order to determine the negotiability of the parking gap 9 by way of these characteristic diagrams, a check is conducted for the actual steering angle $\delta$, the actual yaw angle $\theta$ and the x coordinate determined for the reference point A of the vehicle 1, in order to establish whether the condition $$y_{min}(\delta,\theta,x) < y < y_{max}(\delta,\theta,x)$$

is met for the y coordinate of the reference point A. If this is the case, the negotiability of the parking gap 9 is determined and signaled to the driver. If the condition is not met, it is determined that the parking gap 9 is non-negotiable, starting from the actual position of the vehicle 1.

In general, the available value triple $(\delta,\theta,x)$ will not, however, correspond to a value triple saved in the control unit 4. The value triple that is saved in the control unit 4 and shall be used for the check is determined in this case, within the framework of the invention, in a safe approach, wherein the 'most unfavorable' neighboring value triple saved in the control unit 4 is determined for a value triple $(\delta,\theta,x)$ with the values present in the current state of the vehicle 1.

In this case, the neighboring value triples are first determined for the actual value triple $(\delta,\theta,x)$, i.e. the value triples whose individual values lie adjacent to the actual values of the corresponding quantities. The values $y_{min}$ and $y_{max}$ assigned to the determined value triples are then determined. Thereafter, a check is made in order to establish whether the actual y coordinate of the reference point A of the vehicle 1 is lower than one of the determined $y_{min}$ values or greater than one of the $y_{max}$ values determined. If this is the case, it is determined that the parking gap 9 is non-negotiable. If this is not the case, it is ascertained that the parking gap 9 is negotiable, starting from the actual position of the vehicle 1.

For the purposes of determining the characteristic diagrams $y_{min}(\delta,\theta,x)$ and $y_{max}(\delta,\theta,x)$, the start area is discretized with the possible start position for a parking maneuver, i.e. a grid of points of the start area is defined. The parking maneuver is then simulated for the grid points for various yaw angles $\theta$ and steering angles $\delta$ in order to check whether parking is possible. This makes it possible to obtain a four-dimensional characteristic diagram $f(\delta,\theta,x,y)$ in which all possible combinations of the start values $(\delta,\theta,x,y)$ are specified for which a parking maneuver is possible. On the basis of the characteristic diagram $f(\delta,\theta,x,y)$, it is then possible to determine the characteristic diagrams $y_{min}(\delta,\theta,x)$ and $y_{max}(\delta,\theta,x)$ that are saved in the control unit 4.

However, as previously mentioned, other characteristic diagrams may also be used to determine the negotiability of the parking gap 9, and these can also be determined from the characteristic diagram $f(\delta,\theta,x,y)$. Basically, any characteristic diagrams $z_{1,min}(z_2,z_3,z_4)$ and $z_{1,max}(z_2,z_3,z_4)$ with $z_i \in \{\delta,\theta,x,y\}$ differing in pairs that specify a minimum value $z_{1,min}$ respectively a maximum value $z_{i,max}$ of a second vehicle variable $z_1$ for given sets $(z_2,z_3,z_4)$ of values of initial vehicle variables. The negotiability of the parking gap 9 is ascertained in this case if the following applies to the value of $z_1$ with given values of $z_2$, $z_3$ and $z_4$:

$$z_{1,min}(z_2,z_3,z_4) < z_1 < z_{1,max}(z_2,z_3,z_4)$$

One specific example of other possible characteristic diagrams in this case comprises the characteristic diagrams $\theta_{min}(\delta,x,y)$ and $\theta_{max}(\delta,x,y)$, each stating a minimum value $\theta_{min}(\delta,x,y)$ and a maximum value $\theta_{max}(\delta,x,y)$ for the yaw angle $\theta$ of the vehicle 1 for given value triples $(\delta,x,y)$.

Basically, it would also be possible to ascertain the negotiability of the parking gap 9 on the basis of the characteristic diagram $f(\delta,\theta,x,y)$. However, this would cover substantially more points of reference than the two characteristic diagrams specifying a minimum and a maximum value for a vehicle variable with the same coverage of the valid range. Consequently, using two characteristic diagrams allows a substantial saving on memory space in the control unit 4.

As already mentioned, one embodiment of the invention provides a check being conducted after passing the parking gap in clock steps of a preset clocking duration, i.e. for consecutive points of the path of the vehicle or of the reference point A of the vehicle, in order to establish whether the actual position of the vehicle 1 allows parking in the parking gap 9. The clocking duration in this case is preferably selected in such a manner that a quasi-continuous check of the negotiability of the parking gap 9 is conducted.

In one advantageous further development of the invention, it is provided that, after exiting the valid area specified by the characteristic diagrams, the path of the reference point A of the vehicle 1 and the steering angles set at each of the trajectory points by the driver be saved in the control unit 4. This allows the trajectory to be traced back into the valid range after the start of the parking maneuver at a start point outside of the valid range. In particular, this allows undercutting or parking on inside curves since the trajectory was already negotiated once and it is free of obstacles assuming stationary conditions.

In this embodiment of the invention, it is not indicated to the driver, after the vehicle 1 has reached the valid range, that the parking gap 9 is non-negotiable after leaving this range. Rather, the driver is able to start the parking maneuver even outside the valid range. After the parking maneuver has been started, the vehicle 1 is then steered back into the valid range on the basis of the saved trajectory points and the related steering angles by means of the control unit 4. For this purpose, the control unit 4 transmits correcting commands to the adjusting device 5, with which the steering angle saved previously for this trajectory point is set at each trajectory point. This means that the vehicle, on a path which it has moved on after having left the valid range in a driving direction, usually the straight-ahead direction, is steered back in the opposite direction of driving, usually in the reverse direction, into the valid range. After the vehicle 1 has returned to the valid range in this way, the parking maneuver can be performed in the manner known to the expert in the art, e.g. in a manner as has been described in German published patent application DE 10 2005 006 966 A1.

The invention claimed is:

1. A method of determining a vehicle's ability to enter a parking gap starting from an initial position, the method comprising:
    determining a negotiability by way of two characteristic diagrams ($y_{min}(\delta,\theta,x)$; $y_{max}(\delta,\theta,x)$), with the two characteristic diagrams ($y_{min}(\delta,\theta,x)$; $y_{max}(\delta,\theta,x)$) indicating for several predetermined sets of values of first vehicle quantities ($\delta;\theta; x$) a minimum value ($y_{min}(\delta,\theta,x)$) and a maximum value ($y_{max}(\delta,\theta,x)$) for a second vehicle quantity (y), wherein the first vehicle quantities ($\delta;\theta; x$) and the second vehicle quantity (y) are members of the group consisting of longitudinal (x) distance of the vehicle (1) from the parking gap, a lateral (y) distance of the vehicle (1) from the parking gap (9), yaw angle ($\theta$) of the vehicle (1), and steering angle ($\delta$) at steerable wheels (2a, 2b) of the vehicle (1); and
    generating an output information representing the determination.

2. The method as claimed in claim 1, wherein the negotiability of the parking gap (9) is established when the present value of the second vehicle quantity (y) lies between the minimum value ($y_{min}(\delta,\theta,x)$) and the maximum value ($y_{max}(\delta,\theta,x)$) indicated by the characteristic diagrams ($y_{min}(\delta,\theta,x)$; $y_{max}(\delta,\theta,x)$) for the present values of the first vehicle quantities ($\delta;\theta; x$).

3. The method as claimed in claim 1, wherein the second vehicle quantity (y) is the lateral distance (y) of the vehicle (1) from the parking gap (9).

4. The method as claimed in claim 1, wherein the first vehicle quantities ($\delta; \theta; x$) relate to the longitudinal distance (x) of the vehicle (1) from the parking gap (9) and the yaw angle of the vehicle ($\theta$).

5. The method as claimed in claim 1, wherein the first vehicle quantities ($\delta;\theta; x$) relate to the longitudinal distance (x) of the vehicle (1) from the parking gap (9), the yaw angle of the vehicle ($\theta$) and the steering angle ($\delta$) at the steerable wheels (2a, 2b) of the vehicle (1).

6. The method as claimed in claim 1, wherein the minimum values ($y_{min}(\delta,\theta,x)$) and maximum values ($y_{max}(\delta,\theta,x)$) for the second vehicle quantity (y) indicated by the characteristic diagrams ($y_{min}(\delta,\theta,x)$; $y_{max}(\delta,\theta,X)$) relate to the maneuver of pulling up into a parking gap with the smallest possible longitudinal extension for negotiability.

7. The method as claimed in claim 6, wherein the characteristic diagrams ($y_{min}(\delta,\theta,x)$; $y_{max}(\delta,\theta,x)$) are adapted to the longitudinal extension of the present parking gap (9).

8. The method as claimed in claim 6, wherein the adaptation is carried out by scaling the longitudinal distance (x) of the vehicle (1) from the parking gap (9) with a scaling factor.

9. The method as claimed in any one of claim 8, wherein the yaw angle ($\theta$) of the vehicle (1) is defined as an angle between the vehicle longitudinal direction and an x axis of a system of coordinates, which is directed in a longitudinal direction of the parking gap (9), and in that the adaptation is carried out by transforming the yaw angle ($\theta$) into a system of coordinates whose x axis is scaled with a scaling factor.

10. The method as claimed in claim 8, wherein the scaling factor is determined from a ratio of the longitudinal extensions of the present parking gap (9) to the longitudinal extension of the parking gap with the smallest possible longitudinal extension for negotiability.

11. The method as claimed in claim 10, wherein the scaling factor is predetermined as a function of the longitudinal extension of the present parking gap (9).

12. The method as claimed in claim 1, wherein for a set of actual values of the first vehicle quantities ($\delta;\theta; x$), several predetermined sets with neighboring values for the first vehicle quantities ($\delta;\theta; x$) are determined, and in that it is found out that the parking gap (9) is non-negotiable when the minimum value ($y_{min}(\delta,\theta,x)$) of the second vehicle quantity (y) indicated for one of the determined predetermined sets exceeds the present value of the second vehicle quantity (y).

13. The method as claimed in claim 1, wherein for a set of present values of the first vehicle quantities ($\delta;\theta; x$), several predetermined sets with neighboring values for the first vehicle quantities ($\delta;\theta; x$) are determined, and in that it is found out that the parking gap (9)is non-negotiable when the maximum value ($y_{max}(\delta,\theta,x)$) of the second vehicle quantity (y) indicated for one of the established predetermined sets is lower than the present value of the second vehicle quantity (y).

14. The method as claimed in claim 1, wherein after having passed by the parking gap (9), it is checked in each case for successive points of a path of the vehicle (1), whether it is possible to enter the parking gap (1) from the said points, given the present yaw angle ($\theta$) and the present steering angle ($\delta$).

15. The method as claimed in claim 1, wherein during travel of the vehicle (1) in a first driving direction, the steering angle values of the steering angle ($\delta$) adjusted by the driver at the steerable wheels and the values of the lateral (y) distance and the longitudinal (x) distance of the vehicle (1) which pertain to the steering angle values are saved after it has been established that the second vehicle quantity (y) has fallen below the minimum value ($y_{min}(\delta,\theta,x)$) indicated by a first characteristic diagram (($y_{min}(\delta,\theta,x)$)) or has exceeded the maximum value ($y_{max}(\delta,\theta,x)$) indicated by a second characteristic diagram ($y_{max}(\delta,\theta,x)$).

16. The method as claimed in claim 15, wherein during travel of the vehicle (1) in a second driving direction, the saved steering angle value for the steering angle ($\delta$) of the steerable wheels (2a, 2b) of the vehicle (1) is adjusted by means of a steering angle adjusting device (5) when the lateral (y) distance and the longitudinal (x) distance of the vehicle (1) from the parking gap (9) adopt the values saved with respect to the steering angle value.

17. The method as claimed in claim 16, wherein the saved steering angle values for the steering angle ($\delta$) are adjusted by means of the steering angle adjusting device (5) after the driver has stopped the vehicle (1).

18. A device for determining the ability to enter a parking gap starting from an initial position of a vehicle, the device comprising:

a memory in which two characteristic diagrams ($y_{min}(\delta,\theta,x)$; $y_{max}(\delta,\theta,x)$) are saved, with the two characteristic diagrams ($y_{min}(\delta,\theta,x)$; $y_{max}(\delta,\theta,x)$) indicating for several predetermined sets of values of first vehicle quantities ($\delta$; $\theta$; x) a minimum value ($y_{min}(\delta,\theta,x)$) and a maximum value ($y_{max}(\delta,\theta,x)$) for a second vehicle quantity (y), and with the first vehicle quantities ($\delta$; $\theta$; x) and the second vehicle quantity (y) being selected from a group comprising a longitudinal (x) and a lateral (y) distance of the vehicle (1) from the parking gap (9), a yaw angle ($\theta$) of the vehicle (1) and a steering angle ($\delta$) at steerable wheels (2a, 2b) of the vehicle (1).

* * * * *